United States Patent
Lee et al.

(10) Patent No.: US 8,763,034 B2
(45) Date of Patent: Jun. 24, 2014

(54) METHOD AND APPARATUS FOR REPRODUCING NETWORK CONTENT

(75) Inventors: Moon-sang Lee, Suwon-si (KR); Hwa-kyung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1078 days.

(21) Appl. No.: 11/871,554

(22) Filed: Oct. 12, 2007

(65) Prior Publication Data

US 2008/0256085 A1    Oct. 16, 2008

(30) Foreign Application Priority Data

Apr. 11, 2007    (KR) .................. 10-2007-0035725

(51) Int. Cl.
*G06F 3/00*    (2006.01)
(52) U.S. Cl.
USPC ............................................. 725/37; 725/48
(58) Field of Classification Search
USPC ...................................................... 725/32–61
See application file for complete search history.

(56) References Cited

U.S. PATENT DOCUMENTS

| | | | | |
|---|---|---|---|---|
| 6,144,376 A * | 11/2000 | Connelly | ........................ | 725/44 |
| 6,745,223 B1 * | 6/2004 | Nobakht et al. | .............. | 709/200 |
| 2001/0012024 A1 * | 8/2001 | Rosin et al. | .................... | 345/841 |
| 2002/0157100 A1 | 10/2002 | Kitsukawa et al. | | |
| 2005/0071881 A1 * | 3/2005 | Deshpande | ..................... | 725/88 |
| 2005/0076357 A1 * | 4/2005 | Fenne | .............................. | 725/14 |
| 2006/0168296 A1 | 7/2006 | Kim et al. | | |
| 2008/0148152 A1 * | 6/2008 | Blinnikka et al. | ............ | 715/719 |

FOREIGN PATENT DOCUMENTS

| | | | |
|---|---|---|---|
| CN | | 1335018 A | 2/2002 |
| CN | | 1518690 A | 8/2004 |
| CN | | 1767631 A | 5/2006 |
| CN | | 1790973 A | 6/2006 |
| CN | | 2847734 Y | 12/2006 |
| JP | | 11069324 A | 3/1999 |
| KR | 10-2002-0026707 A | | 4/2002 |
| KR | | 1020040057136 A | 7/2004 |
| KR | 10-2004-0098233 A | | 11/2004 |
| KR | 10-2005-0066865 A | | 6/2005 |
| KR | | 1020060021485 A | 3/2006 |
| WO | | 00/40017 A1 | 7/2000 |

OTHER PUBLICATIONS

Office Action issued by the State Intellectual Property Office of the P. R. of China on Jan. 25, 2011 in the corresponding Chinese Patent Application No. 200810003436.0.

(Continued)

*Primary Examiner* — Hunter B Lonsberry
*Assistant Examiner* — Michael Telan
(74) *Attorney, Agent, or Firm* — Sughrue Mion, PLLC

(57) ABSTRACT

A method and apparatus for reproducing network content are provided. An apparatus for reproducing network content includes a first content list queue storing a content list received from content providing servers; a content list queue management module changing a content list stored in the first content list queue according to a user's command to change the content list; a second content list queue storing the content list changed by the content list queue management module; a content pre-fetch module pre-fetching at least one element of content from the content providing servers based on the second content list queue and storing the content in a local storage unit; and a content reproduction module seamlessly reproducing the at least one element of content stored in the local storage unit.

25 Claims, 11 Drawing Sheets

(56) References Cited

OTHER PUBLICATIONS

Second Office Action issued Aug. 24, 2011 by the State Intellectual Property Office of P.R. China in counterpart Application No. 200810003436.0.

Third Office Action dated May 28, 2012 by the State Intellectual Property Office of the P.R. China in counterpart Application No. 200810003436.0.

Communication dated Aug. 31, 2012 issued but the State Intellectual Property Office of PR China in counterpart Chinese Patent Application No. 200810003436.0.

Communication dated Jun. 26, 2013, issued by the Korean Intellectual Property Office in counterpart Korean Application No. 10-2007-0035725.

* cited by examiner

FIG. 1
PRIOR ART

METHOD AND APPARATUS FOR REPRODUCING NETWORK CONTENT

CROSS-REFERENCE TO RELATED PATENT APPLICATION

This application claims the benefit of Korean Patent Application No. 10-2007-0035725, filed on Apr. 11, 2007, in the Korean Intellectual Property Office, the disclosure of which is incorporated herein in its entirety by reference.

BACKGROUND OF THE INVENTION

1. Field of the Invention

The present invention relates to a digital TV and, more particularly, to a method and apparatus for automatically reproducing content over a network, in a digital TV.

2. Description of the Related Art

Owing to the increase in the popularity of digital cameras, digital camcorders, personal video recorders (PVRs) or the like and the development of online technology, various types of multimedia content, such as user created content (UCC), amateur music video, TV programs or the like, have been distributed online.

Google has recently acquired YouTube, which is a popular video sharing website and occupies more than 50% of the online video content market. Thus, the amount of online multimedia content has increased and is predicted to keep increasing.

Figure 1:
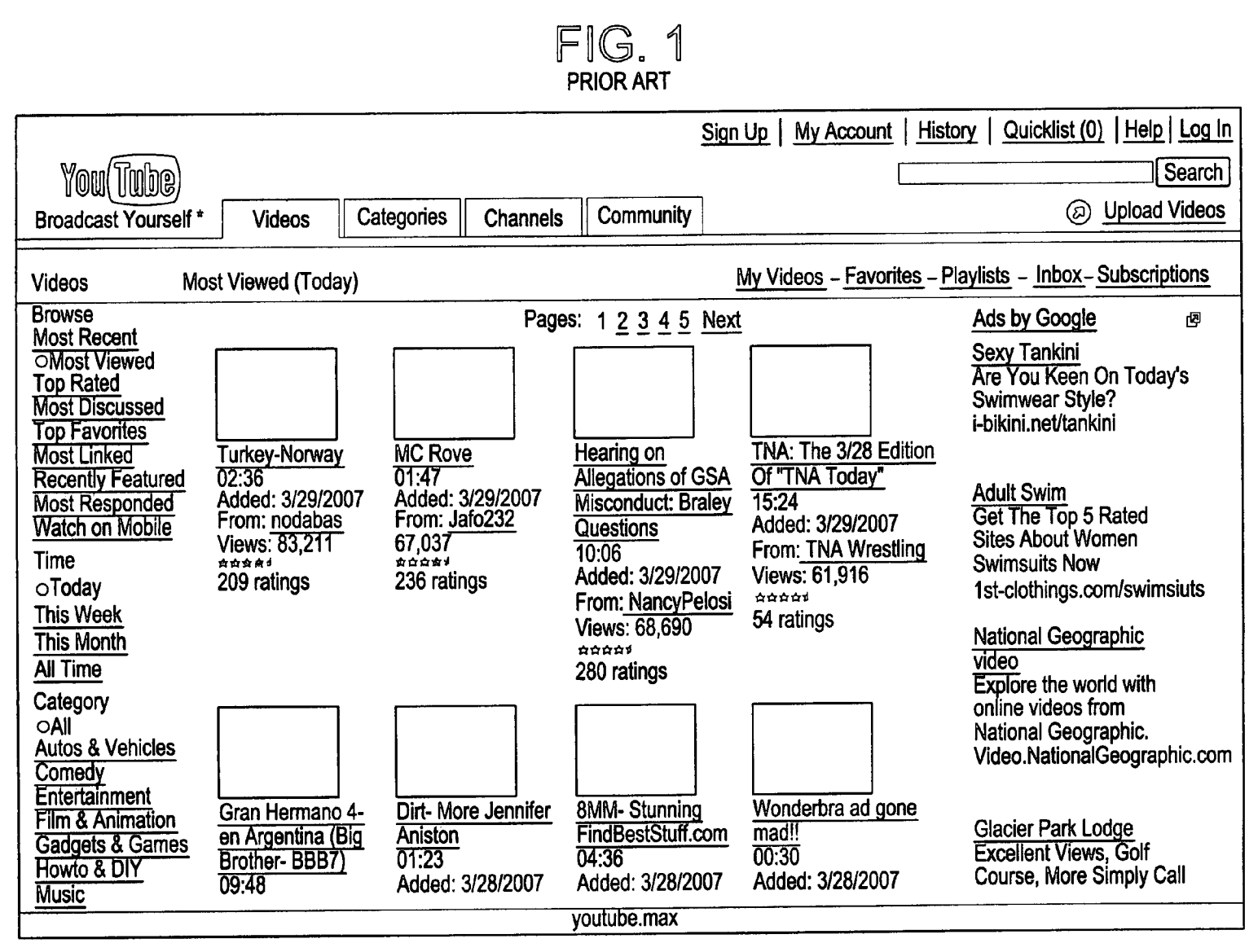

FIG. 1 shows a Web browser displayed on a PC connected to a video content sharing website. Referring to FIG. 1, a user wishing to see certain content selects the content from among many types of video content which are categorized on the Web browser, using a mouse and keyboard, downloads the content, and watches the content via the PC. The user repeats the above operation in order to continuously see plural videos (the so called "PULL method").

Meanwhile, users want to see Internet content using an Internet protocol (IP) TV, which is an Internet connected digital TV. However, since conventional Internet content is designed to be reproduced through the Web browser displayed on the PC, it is difficult to search for and reproduce content by using the TV that has a control panel or a remote controller instead of a mouse and a keyboard.

In more detail, the conventional method of reproducing Internet content is not suitable for TVs since users can see a broadcast program by turning on the TV and another broadcast program by changing channels of the TV (the so called "PUSH method").

Furthermore, when users download content from a conventional Internet content providing website and reproduce the content, it takes some time before the content is reproduced, to buffer the content in order to seamlessly reproduce the content, which causes user inconvenience.

SUMMARY OF THE INVENTION

The present invention provides a method and apparatus for reproducing network content in order to conveniently watch content over a network through a digital TV.

According to an aspect of the present invention, there is provided an apparatus for reproducing network content comprising: a content list queue storing a content list received from content providing servers; a content pre-fetch module pre-fetching at least one element of content from the content providing servers based on the content list queue and storing the content in a local storage unit; and a content reproduction module seamlessly reproducing the at least one element of content stored in the local storage unit.

According to another aspect of the present invention, there is provided an apparatus for reproducing network content comprising: a first content list queue storing a content list received from content providing servers; a content list queue management module changing a content list stored in the first content list queue according to a user's command to change the content list; a second content list queue storing the content list changed by the content list queue management module; a content pre-fetch module pre-fetching at least one element of content from the content providing servers based on the second content list queue and storing the content in a local storage unit; and a content reproduction module seamlessly reproducing the at least one element of content stored in the local storage unit.

According to another aspect of the present invention, there is provided a system for reproducing network content comprising: at least one content providing server; a digital TV receiving at least one element of content from the content providing servers and reproducing the content; and a site-channel mapping server mapping sites of the content providing servers and channels of the digital TV.

According to another aspect of the present invention, there is provided a site-channel mapping method comprising: selecting a site that is to be mapped from at least one content providing site; searching for a channel available for mapping on a digital TV; and mapping the selected site and the found channel on the digital TV.

According to another aspect of the present invention, there is provided a method of reproducing network content comprising: a digital TV accessing a content providing server based on site-channel mapping information; receiving a content list from the content providing server; receiving at least one element of content from the content providing server according to the content list; and seamlessly reproducing the at least one element of content.

According to another aspect of the present invention, there is provided a computer readable recording medium storing a program for executing a site-channel mapping method, the method comprising: selecting a site that is to be mapped from at least one content providing site; searching for a channel available for mapping on a digital TV; and mapping the selected site and the found channel on the digital TV.

According to another aspect of the present invention, there is provided a computer readable recording medium storing a program for executing a method of reproducing network content, the method comprising: accessing a digital TV to a content providing server based on site-channel mapping information; receiving a content list from the content providing server; receiving at least one element of content from the content providing server according to the content list; and seamlessly reproducing the at least one element of content.

BRIEF DESCRIPTION OF THE DRAWINGS

The above and other features and advantages of the present invention will become more apparent by describing in detail exemplary embodiments thereof with reference to the attached drawings in which:

FIG. 1 shows a Web browser displayed on a PC connected to a video content sharing website;

DETAILED DESCRIPTION OF THE INVENTION

The present invention will now be described more fully with reference to the accompanying drawings, in which exemplary embodiments of the invention are shown.

Figure 2:
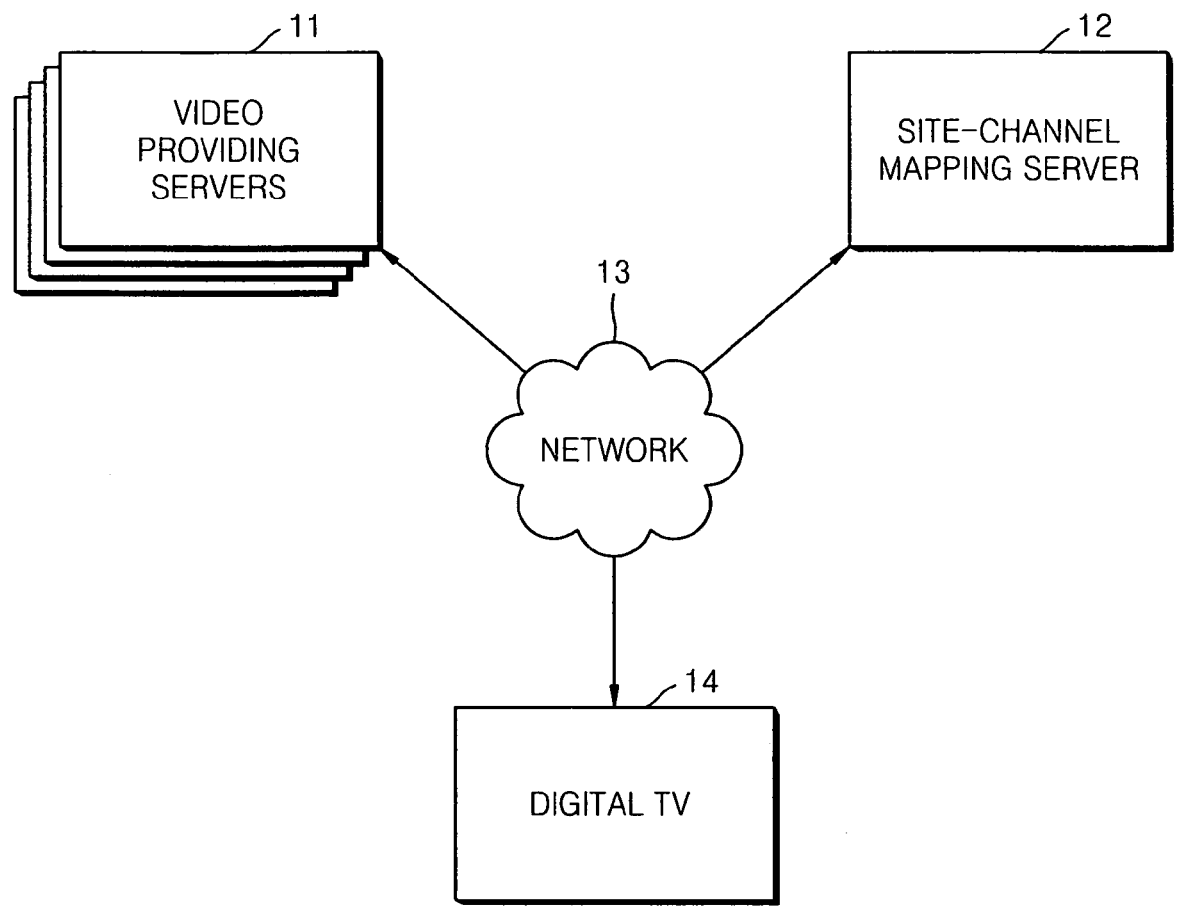
FIG. 2 is a schematic block diagram of a system for reproducing network content, according to an embodiment of the present invention.

FIG. 2 is a schematic block diagram of a system for reproducing network content, according to an embodiment of the present invention. Referring to FIG. 2, the system comprises a plurality of video content providing servers (hereinafter referred to as "video providing servers") 11, a site-channel mapping server 12, a digital TV 14, and a network 13 connecting the plurality of video providing servers 11, the site-channel mapping server 12, and the digital TV 14 via a wired/wireless channel.

Each video providing server 11 serves as a server computer with regard to the digital TV 14, and provides various types of multimedia content including video content to the digital TV 14 over the network 13. Each video providing server 11 of the present embodiment is regarded as a representative of at least one video providing site. Therefore, each video providing server 11 is an independent computer having a different uniform resource location (URL) (or a domain name or an Internet protocol (IP) address). Hereinafter a video providing server and video providing site correspond to each other.

The digital TV 14 of the present embodiment is required to perform the function of a conventional digital TV and have a network interface to communicate data with other computers over the network 13. In more detail, the digital TV 14 must have functions of receiving and reproducing a digital transport stream in the form of a terrestrial broadcasting signal, a cable broadcasting signal, or a multicast broadcast signal, and receiving and reproducing video content from the various video providing servers 11 connected over the network 13.

Therefore, the digital TV 14 of the present embodiment is considered as including an Internet protocol (IP) TV, an Internet TV, a PC having the function of an IPTV, and the conventional digital TV having a set-top box for performing the function of the IPTV.

The network 13 includes all types of wired/wired networks, such as Internet, LAN, or the like.

The site-channel mapping server 12 maps the URL (or the domain name or the IP address) of the video providing server 11 (or video providing site) to one channel of the digital TV 14 and can be designed using conventional Web server technology. The site-channel mapping server 12 can be designed as a part of an IP portal server that is administered by a digital TV manufacturer. A user accesses the site-channel mapping server 12 through a user's digital TV or PC and maps a desired video providing site to a channel of the user's digital TV. The operation of the site-channel mapping server 12 will be described in detail with reference to FIGS. 8 and 9 later.

Information regarding the site-channel mapping by the site-channel mapping server 12 is transmitted to the digital TV 14 over the network 13.

Figure 5:
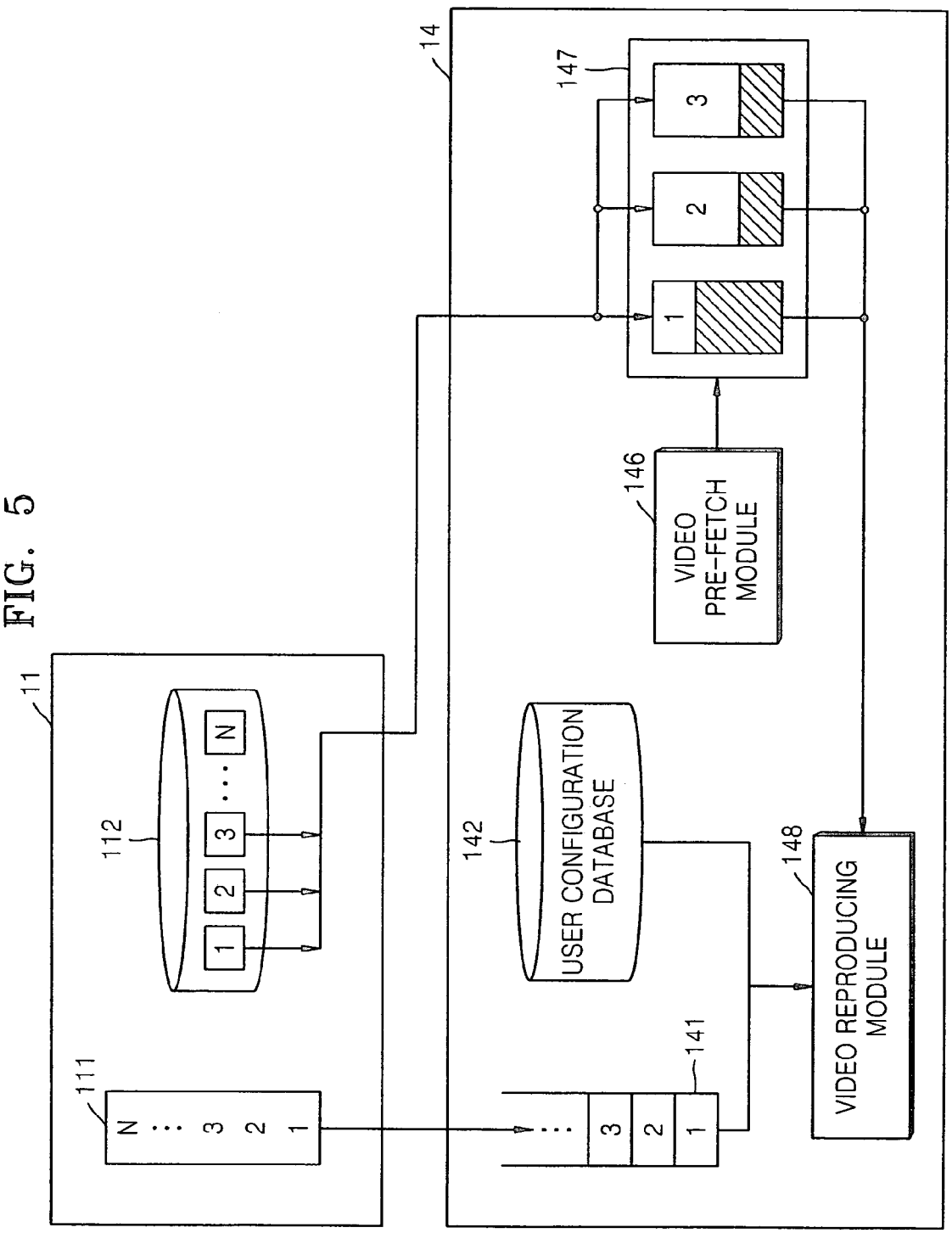
FIG. 5 is a block diagram illustrating a digital TV shown in FIG. 2, for reproducing network content according to an embodiment of the present invention.

FIG. 5 is a block diagram illustrating a digital TV 14 for reproducing network content according to an embodiment of the present invention. Referring to FIG. 5, the digital TV 14 of the present embodiment comprises a video list queue 141, a user configuration database 142, a video pre-fetch module 146, a local memory 147 including a plurality of buffer memories, and a video reproducing module 148.

In addition to the above components, the digital TV 14 includes hardware such as a tuner, a decoder, a de-multiplexer, a CPU, a main board, a display, a remote controller signal receiving unit, or the like, a digital TV device control program for controlling the hardware, and application programs, which are the components of the conventional digital TV. However, these components of the conventional digital TV are omitted in the present embodiment for clarity in the drawings.

The user configuration database 142 stores the site-channel mapping information received from the site-channel mapping server 12, video list editing information or the like. If the user turns the digital TV 14 on and changes a current channel of the digital TV 14 to one of the mapped channels, a controller (a CPU (not shown)) of the digital TV 14 searches the user configuration database 142 for the site mapped to the changed channel and electrically connects a video providing server 11 having the searched site and the digital TV 14.

If the digital TV 14 is electrically connected to the video providing server 11, the digital TV 14 receives a video list 111 from the video providing server 11, and stores the video list 111 in the video list queue 141. The video list 111 stored in the video list queue 141 may remain unchanged. However, if the user configuration database 142 stores the video list editing information, the controller of the digital TV 14 edits the video list 111 based on the video list editing information, and stores the edited video list 111 in the video list queue 141.

Figure 4:
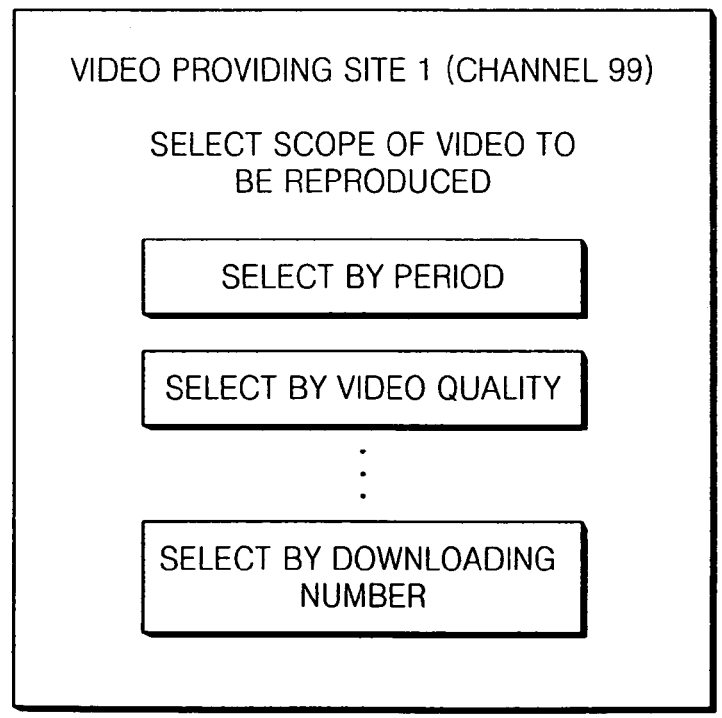
FIG. 4 illustrates a menu window used to edit a video list.

A description of how to edit the video list 111 will be given with reference to FIG. 4 later.

The video pre-fetch module 146 receives front part data of at least one element of video from a video database 112 included in the video providing servers 11 according to the video list 111 stored in the video list queue 141, and buffers the front part data in the local memory 147. In this regard, the number of received videos and the amount of received front part data are properly determined based on the number of buffers, capacity of each buffer, and video quality. The video pre-fetch module 146 receives and buffers the at least one element of video, thereby seamlessly reproducing the video.

The video reproducing module 148 seamlessly reproduces the at least one element of video stored in the local memory 147 in order according to the video list 111 stored in the video list queue 141 without any user's instruction.

The video reproducing module 148 links with different digital TV middleware in charge of the reproduction of video and controls the reproduction of the plurality of elements of video.

The plurality of elements of video reproduced by the digital TV 14 can be displayed in a general display mode. In more detail, a element of video can be displayed on a full screen.

Figure 6:
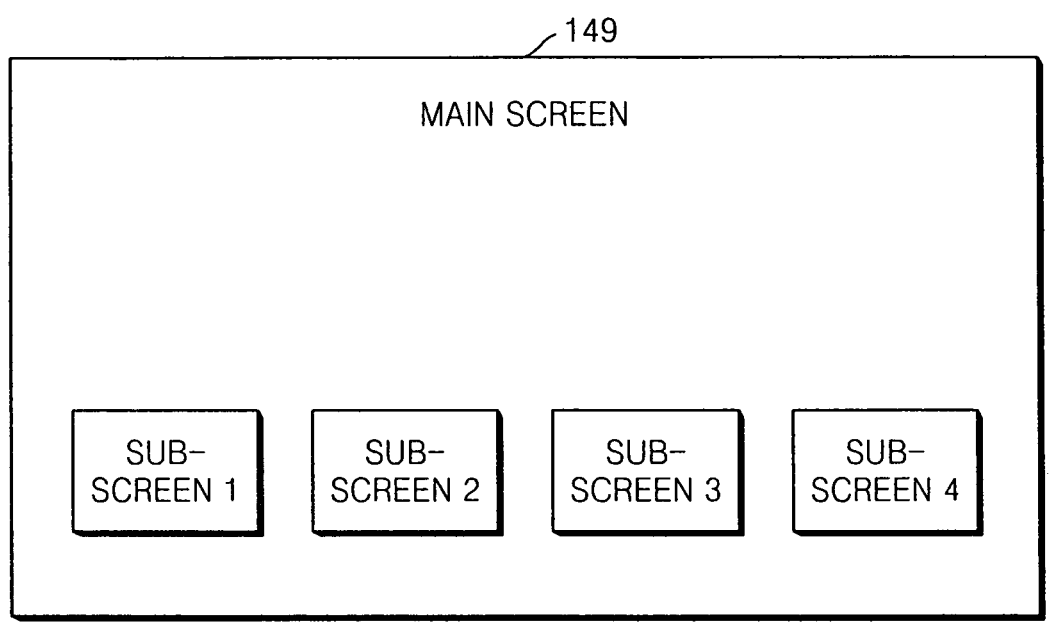
FIG. 6 illustrates a display on which a method of reproducing network content is realized according to an embodiment of the present invention.

FIG. 6 illustrates a display 149 on which a method of reproducing network content is realized according to an embodiment of the present invention. Referring to FIG. 6, the plurality of elements of video can be simultaneously presented on the display 149 in a picture in picture (PIP) display mode. For example, video having first priority in the video list 111 is displayed on a main screen and other elements of video having subsequent priorities are displayed on first through fourth sub-screens. Since the digital TV 14 generally includes two A/V decoders, the video displayed on the first sub-screen is reproduced in the form of moving picture, and the other elements of video are displayed on the second through fourth sub-screens in the form of a still image. In this case, the first sub-screen is in the form of PIP, and the second through fourth sub-screens are in the form of on-screen display (OSD).

Figure 7:
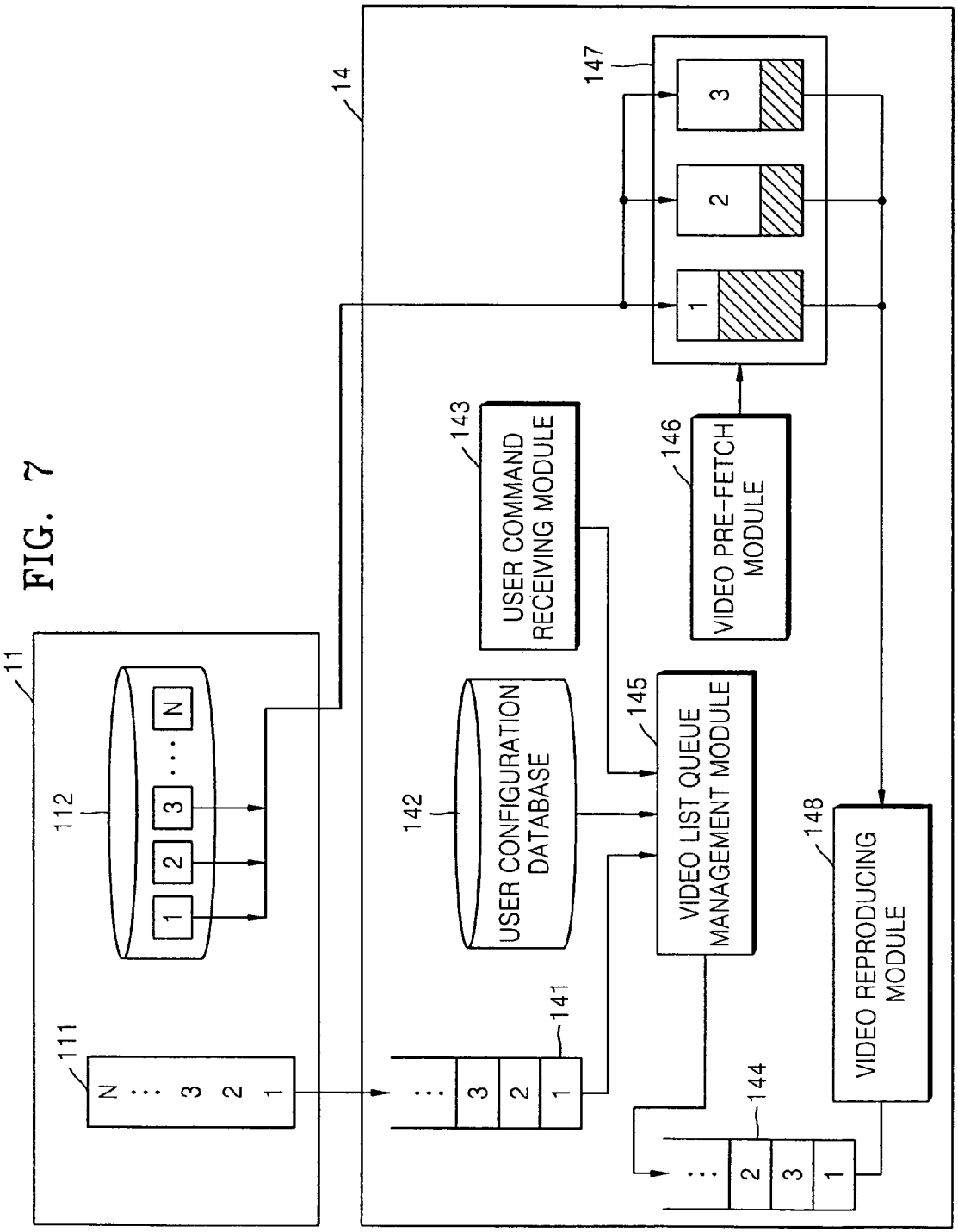
FIG. 7 is a block diagram illustrating a digital TV for reproducing network content according to another embodiment of the present invention.

FIG. 7 is a block diagram illustrating the digital TV 14 for reproducing network content according to another embodiment of the present invention. The digital TV 14 of the present embodiment further comprises a second video list queue 144, a video list queue management module 145, and a user command receiving module 143, as compared to the digital TV 14 illustrated in FIG. 5.

A user can use the additional components in order to change the video list stored in the first video list queue 141. For example, when the user wants to reproduce the element of video currently being reproduced on one of the sub-screens on the main screen, change a reproduction order of some sub-screens, or delete some sub-screens, the user only has to change the video list by using a user input means such as a remote controller while viewing the display 149 shown in FIG. 6 on which the plurality of elements of video are presented. For example, if the user selects the third sub-screen displaying a still image using the remote controller, the first sub-screen displaying a moving picture is changed to display the still image and the third sub-screen 3 is changed to display a moving picture. That is, the priority of the video displayed on the first and third sub-screens is changed in the video list 11 1. In this regard, if the user changes the display mode to the full screen mode, the third sub-screen 3 extends to the main screen.

The user's command to change the video list is received by the user command receiving module 143, and then transmitted to the video list queue management module 145. The video list queue management module 145 changes the video list 111 stored in the first video list queue 141 according to the user's command and transmits the changed video list to the second video list queue 144.

The video pre-fetch module 146 starts or stops buffering performed by the buffers of the local storage unit 147 based on the changed second video list queue 144 or changes a buffering order.

The video reproducing module 148 sequentially reproduces at least one video content that is buffered in the local storage unit 147 based on the changed second video list queue 144.

Figure 8:
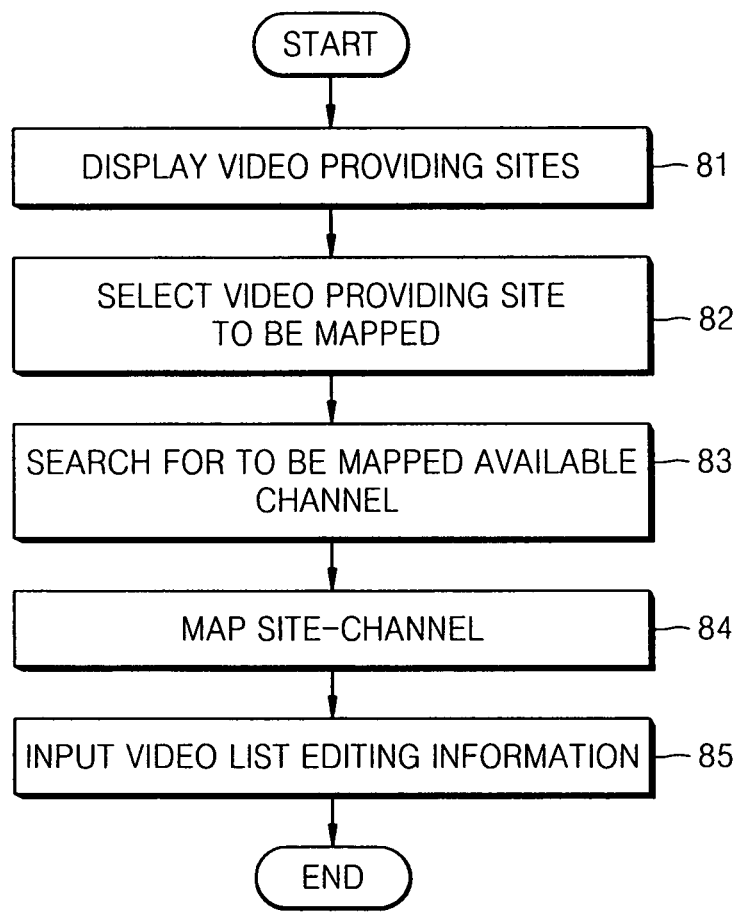
FIG. 8 is a flowchart illustrating a method of mapping a plurality of video providing sites (or a plurality of video providing servers) and channels of a digital TV according to an embodiment of the present invention.

FIG. 8 is a flowchart illustrating a method of mapping a plurality of video providing sites (or a plurality of video providing servers) and channels of a digital TV according to an embodiment of the present invention. The site-channel mapping method will now be described with reference to FIGS. 3A and 8.

Figure 3A:
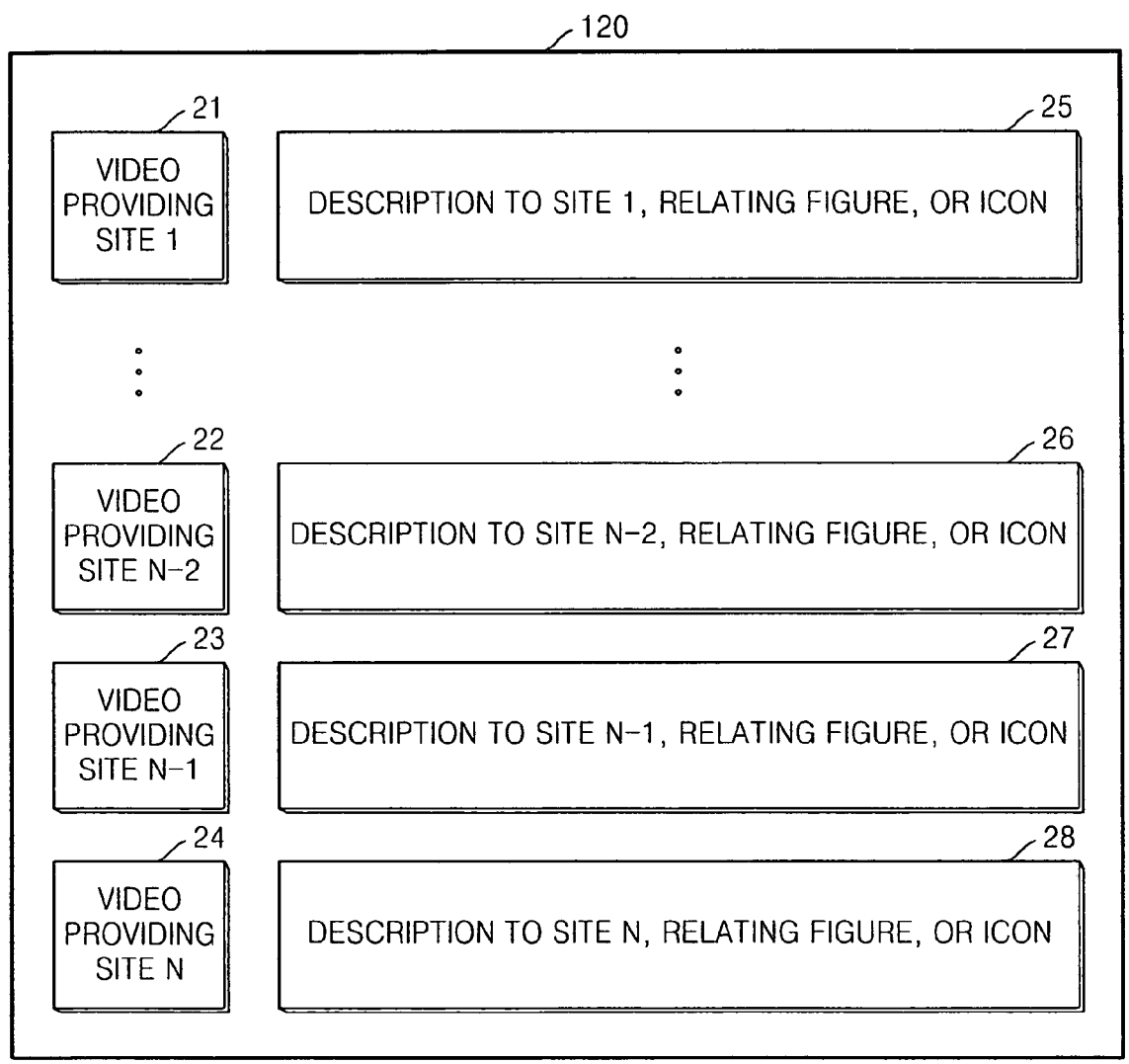
FIGS. 3A through 3C illustrate menu windows necessary for performing a site-channel mapping method according to an embodiment of the present invention.

The plurality of video providing sites registered in the site-channel mapping server is displayed (Operation 81). If a user connects a user's device (a digital TV or PC) to a site-channel mapping server 12, a menu window 120 is displayed on a monitor of the user's device as shown in FIG. 3A. The menu window 120 displays N video providing sites 21-24 that are registered in the site-channel mapping server, and a description of each site, relating figures, or icons 25-28.

The user selects a video providing site that is to be mapped from the N video providing sites 21-24 using an input means of the user's device (Operation 82). It is assumed that the user selects the first video providing site 21.

The site-channel mapping server searches for the first video providing site 21 selected by the user and an available channel of the digital TV (Operation 83).

The first video providing site 21 and the channel of the digital TV are mapped to each other (Operation 84). This operation will be described in more detail with reference to FIG. 9.

Video list editing information is input (Operation 85). This operation is not indispensable to the present invention but is performed according to a user's selection. This operation will be described in more detail with reference to FIG. 10.

Figure 9:
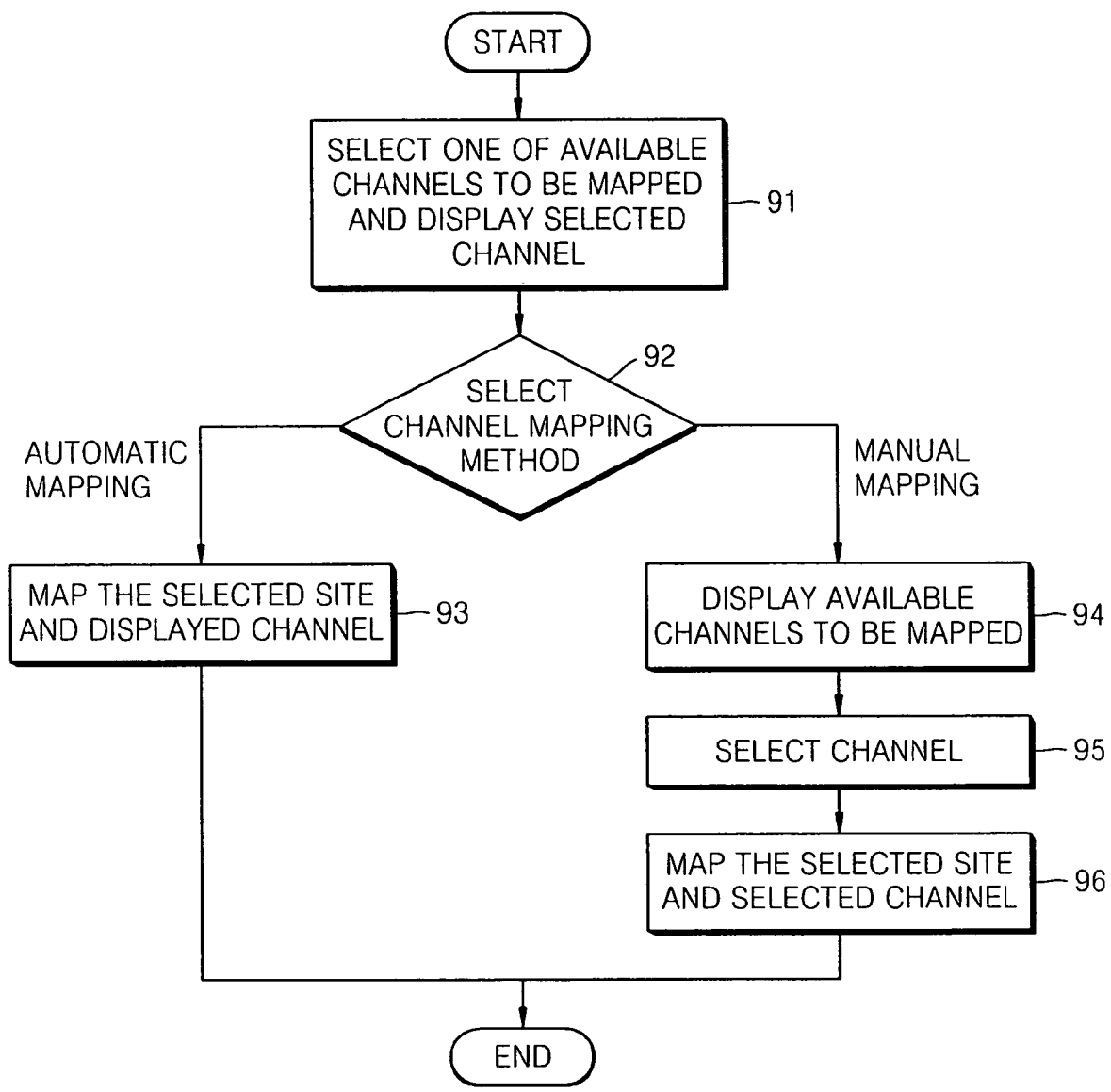
FIG. 9 is a flowchart illustrating a site-channel mapping operation illustrated in FIG. 8.

FIG. 9 is a flowchart illustrating the site-channel mapping operation (Operation 84) illustrated in FIG. 8. The site-channel mapping operation will now be described in detail with reference to FIGS. 3B, 3C, and 9.

Figure 3B:
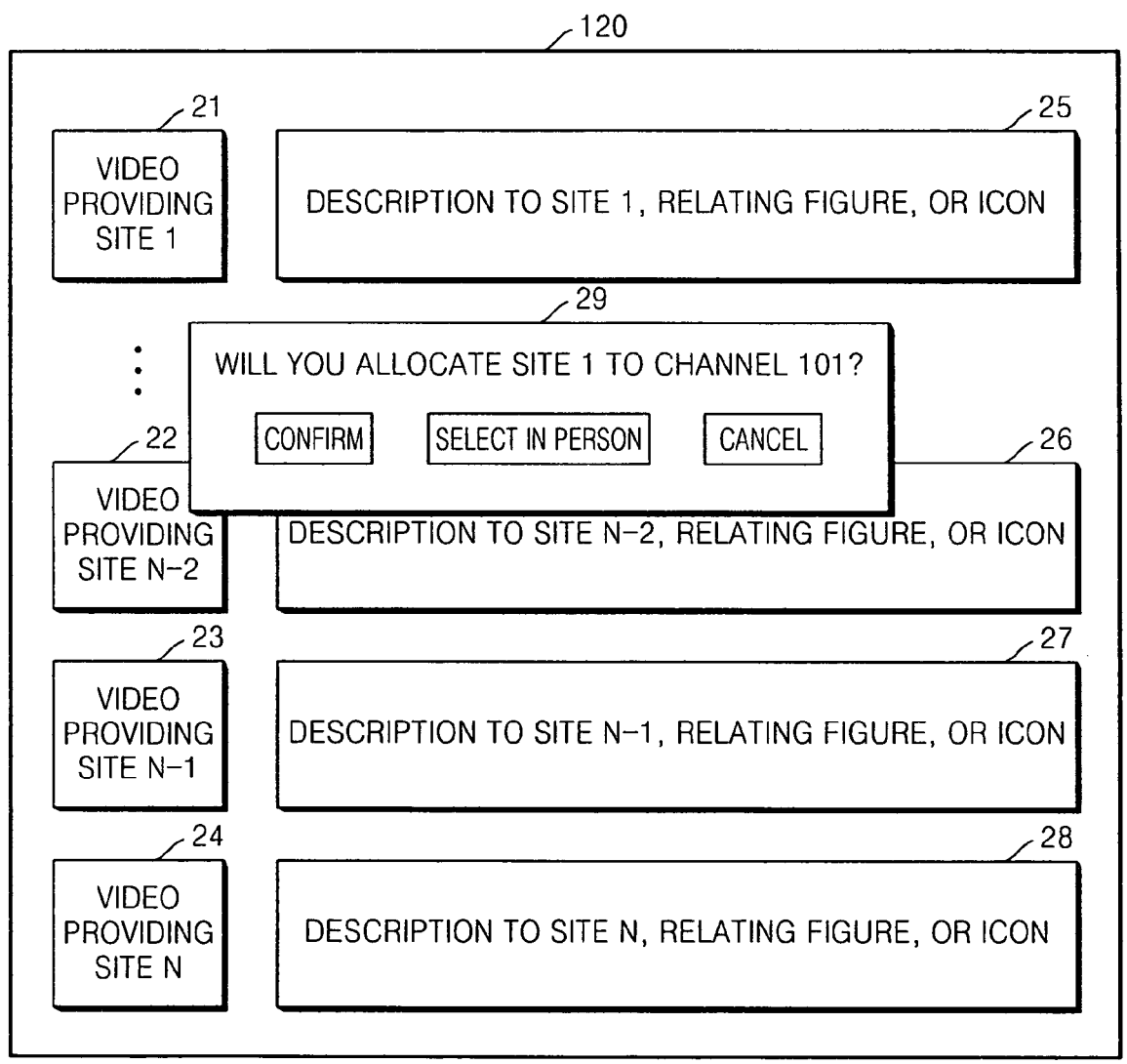

The site-channel mapping server 12 performs a search for available channels of the digital TV to be mapped (Operation 83) and then displays a menu window 29 shown in FIG. 3B asking how to map the channel (Operation 91). One of the found channels (e.g., channel 101), which is the default option, is selected and displayed on the menu window 29.

If a user wants the first video providing site 21 selected by the user to be mapped to the channel 101 of the digital TV, the user has to click a button "confirm" (Operation 92). Then, the first video providing site 21 and the channel 101 of the digital TV are automatically mapped to each other (Operation 93).

Meanwhile, if the user desires to map the first video providing site 21 to a channel other than the channel 101 of the digital TV, the user clicks a button "select manually" (Operation 92).

Figure 3C:
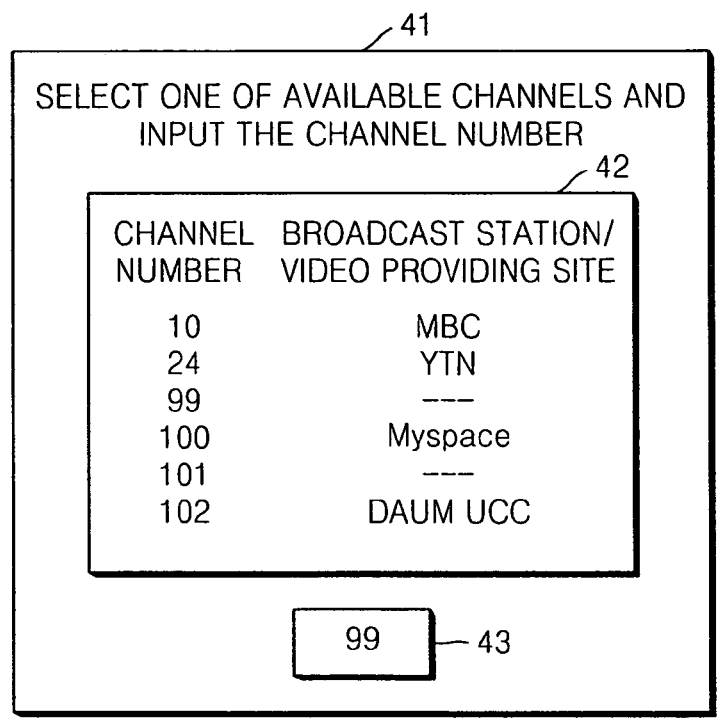

Then, another menu window 41 shown in FIG. 3C pops up (Operation 94). The site-channel mapping status 42 is displayed on the menu window 41. The user selects a channel (e.g., channel 99) from among channels (e.g., the channels 99 and 101) of the digital TV that are not mapped and are displayed on the menu window 41, inputs the selected channel into channel input block 43, and clicks the button "confirm" (Operation 95), so that the first video providing site 21 and the channel 99 of the digital TV are mapped to each other (Operation 96).

Site-channel mapping information obtained using the site-channel mapping server is transmitted to the digital TV 14 over the network 13.

After the first video providing site 21 and the channel 99 of the digital TV are completely mapped to each other, if the user turns on the digital TV 14 and changes a channel of the digital TV 14 to the channel 99, the digital TV is automatically accessed to the first video providing site 21 (or the server). The video providing server 11 transmits all elements of video stored therein or elements of video belonging to a specific category (e.g. video of this year, most popular videos, etc.) to the digital TV 14. At this time, the video providing server 11 transmits a video list that includes URLs of all the transmitted elements of video and information on video sequences.

Generally, the content of the video list is determined by a video providing server or a site-channel mapping server. However, the user can edit the video list in the present embodiment. In more detail, the user can determine a scope of video to be transmitted (corresponding to Operation 85 shown in FIG. 8). That is, after the site-channel mapping operation (Operation 84) is completed, a menu window shown in FIG. 4 pops up on a display of the user's device connected to the site-channel mapping server so as to help the user select the scope of video to be reproduced. The user can edit the video list by various selection categories, e.g., uploading periods (e.g., today's video, video of this year or the like), video quality (e.g., HD level video), a downloading value (e.g., popularity), and a reproduction period of time displayed on the menu window.

Figure 10:
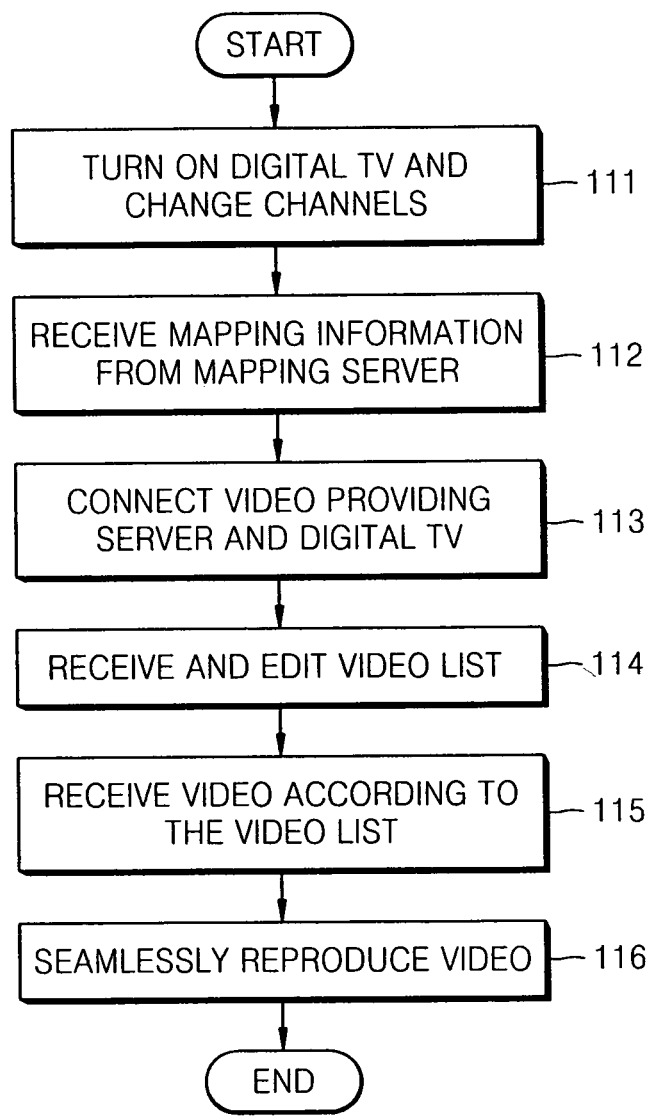
FIG. 10 is a flowchart illustrating a method of reproducing network video according to an embodiment of the present invention.

FIG. 10 is a flowchart illustrating a method of reproducing network video according to an embodiment of the present invention. Referring to FIG. 10, a user turns on a digital TV or changes a channel of the digital TV (Operation 111). The digital TV receives site-channel mapping information from a site-channel mapping server (Operation 112).

The digital TV accesses a video providing server (Operation 113). The digital TV and a video providing server mapped to a current channel of the digital TV are connected to each other over a network based on the site-channel mapping information.

A video list is received and edited (Operation 114). The digital TV receives the video list from the video providing server. If the user establishes video list editing information shown in FIG. 4, the video list is edited based on the video list editing information.

The digital TV sequentially receives at least one element of video according to the received or edited video list (Operation 115).

The at least one element of video is seamlessly reproduced based on the video list (Operation 116).

If at least one element of video is reproduced, after a element of video is completely reproduced and before the next video is reproduced, a logo image or an advertisement image is inserted therebetween in order to notify the user of the beginning and end of a video.

The order of Operations 111 and 112 may be switched over in another embodiment of the present invention.

The method of reproducing video of the present invention can also be embodied as computer readable code on a computer readable recording medium. For example, the video pre-fetch module 146, the video reproducing module 148, and the video list queue management module 145 included in the apparatus for reproducing video of the present invention can be embodied as computer readable programs. And also the video list queue 141, the user configuration database 142, the first video list queue 141, the second video list queue 144, and the local memory 147 of the present invention can be embodied by using a given memory included in a conventional digital TV and thus the method of reproducing video of the present invention can be embodied without adding new hardware to the conventional digital TV.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

The apparatus and method for reproducing network content of the present invention can allow a user to watch several elements of video content over the Internet by turning on a digital TV using a remote controller, and video content of a different site by changing channels of the digital TV.

The apparatus for reproducing network content of the present invention pre-fetches at least one element of video content and buffers the video content, thereby allowing the user to seamlessly watch several elements of video.

The present invention can simultaneously display several elements of video content in a PIP display mode, so that the user can be informed of video content to be reproduced in advance and easily change a reproduction order of video content using the remote controller.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in a descriptive sense only, and not for purposes of limitation. Therefore, the scope of the invention is defined not by the detailed description of the invention but by the appended claims, and all differences within the scope will be construed as being included in the present invention.

What is claimed is:

1. An apparatus for reproducing network content, the apparatus comprising:
  a content list queue which stores a content list received from content providing servers corresponding to content providing sites, wherein selections of the content providing sites are received from a user of a digital TV and the content providing sites are mapped to channels of the digital TV which are available to be mapped;
  a content pre-fetch module which pre-fetches at least one element of content from one of the content providing servers, via a corresponding mapped channel which connects the one content providing server to the digital TV, based on the content list queue, and stores the content in a local storage unit; and
  a content reproduction module which seamlessly reproduces the at least one element of content stored in the local storage unit,
  wherein the channels of the digital TV, which are available to be mapped, are selected among channels which are unmapped for transmitting a TV signal, and the unmapped channels are searched and located, among the channels of the digital TV, by a mapping server, prior to mapping, and
  a channel list including the channels of the digital TV and the channels to which the content providing sites have been matched, by the mapping server, is provided to the user.

2. The apparatus of claim 1, further comprising:
  a user configuration database which stores mapping information between the content providing sites of the content providing servers and the channels of the digital TV.

3. The apparatus of claim 1, wherein the user configuration database which stores information used for editing the content list stored in the content list queue.

4. The apparatus of claim 3, further comprising:
  a controller which edits the content list received from the content providing servers based on the editing information stored in the user configuration database.

5. The apparatus of claim 3, wherein the information used for editing the content list, which is stored in the user configuration database, is configured by a user in advance.

6. The apparatus of claim 1, wherein the network content is video content.

7. The apparatus of claim 1, wherein the local storage unit comprises at least one buffer memory.

8. The apparatus of claim 1, wherein the content pre-fetch module buffers at least one element of content in the local storage unit in order to seamlessly reproduce a plurality of elements of content.

9. A digital TV comprising an apparatus for reproducing the network content of claim 1.

10. An apparatus for reproducing network content, the apparatus comprising:
- a first content list queue which stores a content list received from content providing servers corresponding to content providing sites, wherein selections of the content providing sites are received from a user of a digital TV and the content providing sites are mapped to channels of the digital TV which are available to be mapped;
- a content list queue management module which changes a content list stored in the first content list queue according to a user's command to change the content list;
- a second content list queue which stores the content list changed by the content list queue management module;
- a content pre-fetch module which pre-fetches at least one element of content from one of the content providing servers, via a corresponding mapped channel which connects the one content providing server to the digital TV, based on the second content list queue, and stores the content in a local storage unit; and
- a content reproduction module which seamlessly reproduces the at least one element of content stored in the local storage unit,
- wherein the channels of the digital TV, which are available to be mapped, are selected among channels which are unmapped for transmitting a TV signal, and the unmapped channels are searched and located, among the channels of the digital TV, by a mapping server, prior to mapping, and
- a channel list including the channels of the digital TV and the channels to which the content providing sites have been matched, by the mapping server, is provided to the user.

11. The apparatus of claim 10, further comprising:
a user command module which receives a user's command to change a content reproduction order.

12. The apparatus of claim 10, wherein the network content is video content.

13. A system for reproducing network content, the system comprising:
- content providing servers corresponding to content providing sites;
- a digital TV which receives at least one element of content from the content providing servers and reproduces the content; and
- a site-channel mapping server which receives selections of the content providing sites from a user of the digital TV, searches for and locates channels of the digital TV available to provide the network content from the content providing servers corresponding to the content providing sites selected by the user, and maps the content providing sites of the content providing servers to the located channels of the digital TV,
- wherein the channels of the digital TV, which are available to be mapped, are selected among channels which are unmapped for transmitting a TV signal, and the unmapped channels are searched and located, among the channels of the digital TV, by the site-channel mapping server, prior to mapping, and
- a channel list including the channels of the digital TV and the channels to which the content providing sites have been matched, by the site-channel mapping server, is provided to the user.

14. The system of claim 13, wherein, when a channel of the digital TV is changed to one of the mapped channels, the digital TV is automatically connected to one of the content providing servers of one of the content providing sites mapped to the one of the mapped channels.

15. The system of claim 13, wherein the digital TV receives content lists from the content providing servers.

16. The system of claim 15, wherein the digital TV receives at least one element of content from the content providing servers according to the content lists and seamlessly reproduces the content.

17. The system of claim 15, wherein the content lists are edited by the user.

18. The system of claim 13, wherein the digital TV comprises a display displaying one main screen and two or more sub-screens.

19. The system of claim 18, wherein one of the sub-screens displays the content in a moving picture format, and another displays the content in a still image format.

20. A method of reproducing network content, the method comprising:
- receiving, from a user of a digital TV, a selection of a content providing site;
- mapping the content providing site to a channel of the digital TV which is available to be mapped;
- accessing, by the digital TV, a content providing server corresponding to the content providing site, based on site-channel mapping information;
- receiving a content list from the content providing server;
- receiving at least one element of content from the content providing server according to the content list, via a mapped channel which connects the content providing server to the digital TV; and
- seamlessly reproducing the at least one element of content,
- wherein the channels of the digital TV, which are available to be mapped, are selected among channels which are unmapped for transmitting a TV signal, and the unmapped channels are searched and located, among the channels of the digital TV, by a mapping server, prior to mapping, and
- a channel list including the channels of the digital TV and the channels to which the content providing sites have been matched, by the mapping server, is provided to the user.

21. The method of claim 20, further comprising:
receiving site-channel mapping information from the site-channel mapping server.

22. The method of claim 20, further comprising:
editing the content list.

23. The method of claim 20, wherein the seamlessly reproducing of the at least one element of content comprises:
inserting a logo image or an advertisement image between content elements.

24. A non-transitory computer readable recording medium storing a program for executing a method of reproducing network content, the method comprising:
- receiving, from a user of a digital TV, a selection of a content providing site;
- mapping the content providing site to a channel of the digital TV which is available to be mapped;
- accessing the digital TV to a content providing server corresponding to the content providing site, based on site-channel mapping information;

receiving a content list from the content providing server;

receiving at least one element of content from the content providing server according to the content list, via a mapped channel which connects the content providing server to the digital TV; and seamlessly reproducing the at least one element of content, wherein the channels of the digital TV, which are available to be mapped, are selected among channels which are unmapped for transmitting a TV signal, and the unmapped channels are searched and located, among the channels of the digital TV, by a mapping server, prior to mapping, and a channel list including the channels of the digital TV and the channels to which the content providing sites have been matched, by the mapping server, is provided to the user.

25. The apparatus of claim 1, further comprising:

a display which displays the channel list comprising the channels of the digital TV which transmit TV signals, the unmapped channels, and the channels mapped to the content providing sites, which are sequentially listed in the displayed channel list in an order of digital TV channel numbers.

\* \* \* \* \*